United States Patent
Takemoto et al.

(10) Patent No.: US 10,012,558 B2
(45) Date of Patent: Jul. 3, 2018

(54) COMBUSTION PRESSURE SENSOR

(71) Applicant: DENSO CORPORATION, Kariya, Aichi-pref. (JP)

(72) Inventors: Shoichi Takemoto, Kariya (JP); Syuichi Nakano, Kariya (JP); Nobuyuki Abe, Kariya (JP); Kenji Ito, Kariya (JP); Takashi Furukawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 57 days.

(21) Appl. No.: 15/343,456

(22) Filed: Nov. 4, 2016

(65) Prior Publication Data
US 2017/0131166 A1 May 11, 2017

(30) Foreign Application Priority Data
Nov. 6, 2015 (JP) .................................. 2015-218523

(51) Int. Cl.
*G01L 9/00* (2006.01)
*F23Q 7/00* (2006.01)

(52) U.S. Cl.
CPC .............. *G01L 9/008* (2013.01); *F23Q 7/001* (2013.01); *F23Q 2007/002* (2013.01)

(58) Field of Classification Search
CPC ... F23Q 2007/002; F23Q 7/001; G01L 9/008; G01L 23/22; F02D 35/023; F02P 19/028
See application file for complete search history.

(56) References Cited

U.S. PATENT DOCUMENTS

| | | | | |
|---|---|---|---|---|
| 6,539,787 B1 * | 4/2003 | Murai | .................... | F02D 35/023 73/114.21 |
| 7,726,196 B2 * | 6/2010 | Friedl | ...................... | G01L 23/10 73/721 |
| 8,893,545 B2 * | 11/2014 | Nakamura | ............ | G01M 15/08 73/114.18 |
| 9,366,594 B2 * | 6/2016 | Maeda | ...................... | G01L 23/08 |
| 9,709,272 B2 * | 7/2017 | Scholzen | ................ | F23Q 7/001 |
| 9,891,138 B2 * | 2/2018 | Hirokawa | ............... | F23Q 7/001 |

FOREIGN PATENT DOCUMENTS

| | | |
|---|---|---|
| JP | 2003-316796 | 11/2003 |
| JP | 2005-016984 | 1/2005 |
| JP | 2013-228175 | 11/2013 |
| JP | 2014-028069 | 2/2014 |
| JP | 2015-152274 | 8/2015 |

* cited by examiner

*Primary Examiner* — Freddie Kirkland, III
(74) *Attorney, Agent, or Firm* — Nixon & Vanderhye P.C.

(57) ABSTRACT

In a combustion pressure sensor, a sensor holder is installed in a housing. The sensor holder has an end contact surface. A load transfer member is installed in the housing. The load transfer member has a contact surface facing the end contact surface of the sensor holder. The contact surface of the load transfer member is in contact with the end contact surface of the sensor holder. One of the contact surface of the load transfer member and the end contact surface of the sensor holder has a concavely curved shape, and the other thereof has a convexly curved shape.

9 Claims, 6 Drawing Sheets

COMBUSTION PRESSURE SENSOR

CROSS REFERENCE TO RELATED APPLICATIONS

This application is based on and claims the benefit of priority from Japanese Patent Application 2015-218523 filed on Nov. 6, 2015, the disclosure of which is incorporated in its entirety herein by reference.

TECHNICAL FIELD

The present disclosure relates to combustion pressure sensors for measuring combustion pressure.

BACKGROUND

One typical example of conventional combustion pressure sensors for detecting a combustion pressure in a combustion chamber of an internal combustion engine is disclosed in Japanese Patent Application Publication No. 2015-152274, referred to as patent document 1.

The combustion pressure sensor disclosed in patent document 1 includes a housing whose tip end abuts on a reduced-diameter portion of a plug fitting hole of an internal combustion engine. An external screw mounted to a base end of the housing, which is opposite to the tip end, is threadably engaged with an internal screw formed to the plug fitting hole of the engine, so that the combustion pressure sensor is fitted in the plug fitting hole.

In the combustion pressure sensor, a compressive stress applied to the engine head based on the combustion pressure in the combustion chamber is applied as a load to the housing fitted in the plug fitting hole. The housing is therefore subjected to the compressive stress, so that the compressive stress is applied as a load to a load transfer member installed in the housing. This results in the load being transferred to a piezoelectric element held by a sensor holder, i.e. a sensor housing. This causes the piezoelectric element to measure the combustion pressure in the combustion chamber according to the load applied to the piezoelectric element.

Each of the load transfer member sensor holder is comprised of a hollow cylindrical member. The load transfer member has an annular tip end formed with an annular contact surface contacting with the housing, and an annular base end opposite to the annular tip end; the annular base end is formed with an annular contact surface contacting with an annular contact surface of the sensor holder.

Another typical example of such conventional combustion pressure sensors is disclosed in Japanese Patent Application Publication No. 2005-16984, referred to as patent document 2.

The combustion pressure sensor disclosed in patent document 2 includes a hollow housing with a tip end and a base end opposite to the tip end, and a diaphragm head having a diaphragm portion installed in the tip end of the hollow housing; the diaphragm head is subjected to pressure variations in the combustion chamber. The combustion pressure sensor also includes a piezoelectric stack, which is comprised of the set of stacked piezoelectric elements sandwiched and pressurized by first and second electrodes. The configuration of the combustion pressure sensor disclosed in patent document 2 enables the piezoelectric stack to detect variations of the pressure applied to the piezoelectric stack, thus detecting the combustion pressure in the combustion chamber based on the variations of the pressure applied to the piezoelectric stack.

In the combustion pressure sensor disclosed in patent document 2, a cylindrical inner body is installed in the housing, and provided at the base end side of the second electrode via an insulating ring. The cylindrical inner body includes a first cylindrical inner body and a second cylindrical inner body. The first cylindrical inner body has a tip end and a base end opposite thereto. The first cylindrical inner body has formed a conical concave surface at the base end, and the second cylindrical inner body has formed a spherical convex surface at the tip end. An external screw of the second cylindrical inner body is threadably engaged with an internal screw of the housing, and the conical concave surface of the base end of the first cylindrical inner body and the spherical convex surface of the tip end of the second inner body abut on each other. This results in the first cylindrical inner body and the second cylindrical inner body being in alignment with each other. This alignment of the first and second cylindrical inner bodies prevents an unbalanced load from being applied to the piezoelectric stack when the diaphragm head is subjected to pressure variations in the combustion chamber.

SUMMARY

Unfortunately, there may be machining dimensional errors of the load transfer member, sensor holder, and housing or errors of perpendicularity of contact surfaces between the load transfer member and sensor holder when mounting the combustion pressure sensor disclosed in patent document 1 to the plug fitting hole of the internal combustion engine. These machining dimensional errors and/or error of perpendicularity may cause the load transfer member or sensor holder to be disposed in the housing while the axial, i.e. longitudinal, direction of the load transfer member or that of the sensor holder is inclined with respect to the axial direction of the housing.

If the load transfer member or sensor holder is disposed in the housing while the axial, i.e. longitudinal, direction of the load transfer member or that of the sensor holder is inclined with respect to the axial direction of the housing, the annular contact surface of the load transfer member at the annular base end may not uniformly contact the annular contact surface of the sensor holder in their circumferential directions. This may make it difficult for the load transfer member to apply a load to each of the sensor holder and the piezoelectric element uniformly in their circumferential directions. This circumferential non-uniform application of a load to each of the sensor holder and the piezoelectric element may result in the combustion pressure sensor measuring incorrect values of the combustion pressure in the combustion chamber.

An increase of the combustion-pressure measurement accuracy of the combustion pressure sensor requires strict management of the machining accuracy of each of the load transfer member, sensor holder, and housing, and the mounting accuracy of each of the load transfer member, sensor holder, and housing to the internal combustion engine.

On the other hand, the first inner body and the second inner body disclosed in patent document 2 are provided to apply pre-compression to the stacked piezoelectric elements. This configuration eliminates a member corresponding to the load transfer member disclosed in patent document 1, and therefore eliminates the need to transfer a compression stress applied to the housing to the stacked semiconductor elements.

As described above, the spherical convex surface of the second inner body abuts on the conical concave surface of the first inner body. How the spherical convex surface of the second inner body abuts on the conical concave surface of the first inner body is that a predetermined outer peripheral portion of the spherical convex surface of the second inner body abuts on a predetermined inner peripheral portion of the conical concave surface of the first inner body in linear contact between each other. The entire inner peripheral portion of the conical concave surface has the same length relative to the innermost center of the conical concave surface.

Machining dimensional errors of, for example, at least one of the first and second inner bodies may cause the axial direction of first inner body or the second inner body to be inclined with respect to the axial direction of the housing. This inclination may cause the predetermined outer peripheral portion of the spherical convex surface of the second inner body not to uniformly abut on the predetermined inner peripheral portion of the conical concave surface of the first inner body in the circumferential direction of each of the first and second inner bodies.

This may make it difficult for each of the first and second inner bodies to apply a load to the stack of the piezoelectric elements uniformly in the circumferential direction of the stack of the piezoelectric elements.

In other words, the feature, which is disclosed in patent document 2, that the spherical convex surface of the second inner body abuts on the conical concave surface of the first inner body aims to merely align the first cylindrical inner body with the second cylindrical inner body. The above feature therefore may have difficulty in uniformly applying a load to the stack of the piezoelectric elements if the axial direction of the first or second inner body is inclined with respect to the axial direction of the housing. That is, the combustion pressure disclosed in patent document 2 may also result in reduction of the combustion-pressure measurement accuracy of the combustion pressure sensor if the axial direction of the first or second inner body is inclined with respect to the axial direction of the housing.

In view of the circumstances set forth above, an exemplary aspect of the present disclosure seeks to provide combustion pressure sensors, each of which is designed to address the above problems.

That is, a specific exemplary aspect of the present disclosure seeks to provide such combustion pressure sensors, each of which is capable of measuring the combustion pressure with higher measurement accuracy and with simpler management of machining accuracy of each component of the combustion pressure sensor.

According to a first exemplary aspect of the present disclosure, there is provided a combustion pressure sensor. The combustion pressure sensor includes a hollow longitudinal housing to be mounted in a plug mount hole of an engine with a combustion chamber. the plug mount hole communicates with the combustion chamber of the engine. The housing includes a support portion having a support surface. The combustion pressure sensor includes a sensor holder installed in the housing, the sensor holder having an end contact surface at one end thereof. The combustion pressure sensor includes a load transfer member installed in the housing for transferring a compressive stress applied to the housing to the sensor holder as a load. The load transfer member has a first contact surface at a first end thereof and a second contact surface at a second end, opposite to the first end, thereof in the longitudinal direction of the housing. The first contact surface of the load transfer member is in contact with the support surface of the support portion of the housing. The second contact surface of the load transfer member is in contact with the end contact surface of the sensor holder. The combustion pressure sensor includes a pressure sensor mechanism, held by the sensor holder, for obtaining a pressure in the combustion chamber based on the load transferred thereto from the load transfer member. The combustion pressure sensor includes at least one of a first configuration and a second configuration. The first configuration represents that one of the first contact surface and the support surface has a concavely curved shape and the other thereof has a convexly curved shape. The second configuration represents that one of the second contact surface and the end contact surface has a concavely curved shape and the other thereof has a convexly curved shape.

The first configuration enables one of the longitudinal line of the load transfer member and the longitudinal line of the housing to tilt relative to the other thereof even if there is a dimensional error of at least one of the components including the housing, the sensor holder, and the load transfer member. The second configuration enables one of the longitudinal line of the load transfer member and the longitudinal line of the sensor holder to tilt relative to the other thereof even if there is a dimensional error of at least one of the components including the housing, the sensor holder, and the load transfer member.

Each of the first and second configurations therefore enables the convexly curved contact surface and the concavely curved contact surface, which are contact surfaces between the load transfer member and the housing or between the load transfer member and the sensor holder, to be constantly in contact with each other. This absorbs adverse effects caused by an inclination of one of the longitudinal direction of the load transfer member and the sensor holder or the housing relative to the longitudinal direction of the other thereof. This enables the load transfer member to transfer, to the whole of the sensor holder and the pressure sensor mechanism, a load uniformly around the load transfer member. This prevents a load applied to the pressure sensor mechanism from being biased. This therefore enables the combustion pressure sensor to measure the combustion pressure in the combustion chamber with higher accuracy while maintaining simpler management of machining accuracy of each component of the combustion pressure sensor.

According to a second exemplary aspect of the present disclosure, there is provided a combustion pressure sensor. The combustion pressure sensor includes a hollow longitudinal housing to be mounted in a plug mount hole of an engine with a combustion chamber. The plug mount hole communicates with the combustion chamber of the engine. The combustion pressure sensor includes a sensor holder installed in the housing, the sensor holder having an end with a concavely curved contact surface. The combustion pressure sensor includes a load transfer member installed in the housing for transferring a compressive stress applied to the housing to the sensor holder as a load. The load transfer member has an end facing the end of the sensor holder. The end of the load transfer member has a concavely curved contact surface. The combustion pressure sensor includes a pressure sensor mechanism, held by the sensor holder, for obtaining a pressure in the combustion chamber based on the load transferred thereto from the load transfer member. The combustion pressure sensor includes a joint member installed in the housing and interposed between the first end of the sensor holder and the second end of the load transfer member. The joint member has a first convexly curved end surface and a second convexly curved end surface opposite to each other in the longitudinal direction of the housing. The concavely curved contact surface of the sensor holder is in contact with the first convexly curved end surface of the joint member. The concavely curved contact surface of the load transfer member is in contact with the second convexly curved end surface of the joint member.

This configuration of the combustion pressure sensor enables each of the first and second convexly curved contact surface of the joint member to be constantly in contact with the concavely curved contact surface of the corresponding one of the sensor holder and the load transfer member. This absorbs adverse effects caused by an inclination of one of the longitudinal direction of the load transfer member and the sensor holder relative to the longitudinal direction of the other thereof. This enables the load transfer member to transfer, to the whole of the sensor holder and the pressure sensor mechanism, a load uniformly around the load transfer member. This prevents a load applied to the pressure sensor mechanism from being biased. This therefore enables the combustion pressure sensor to measure the combustion pressure in the combustion chamber with higher accuracy while maintaining simpler management of machining accuracy of each component of the combustion pressure sensor according to the second aspect.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more features of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
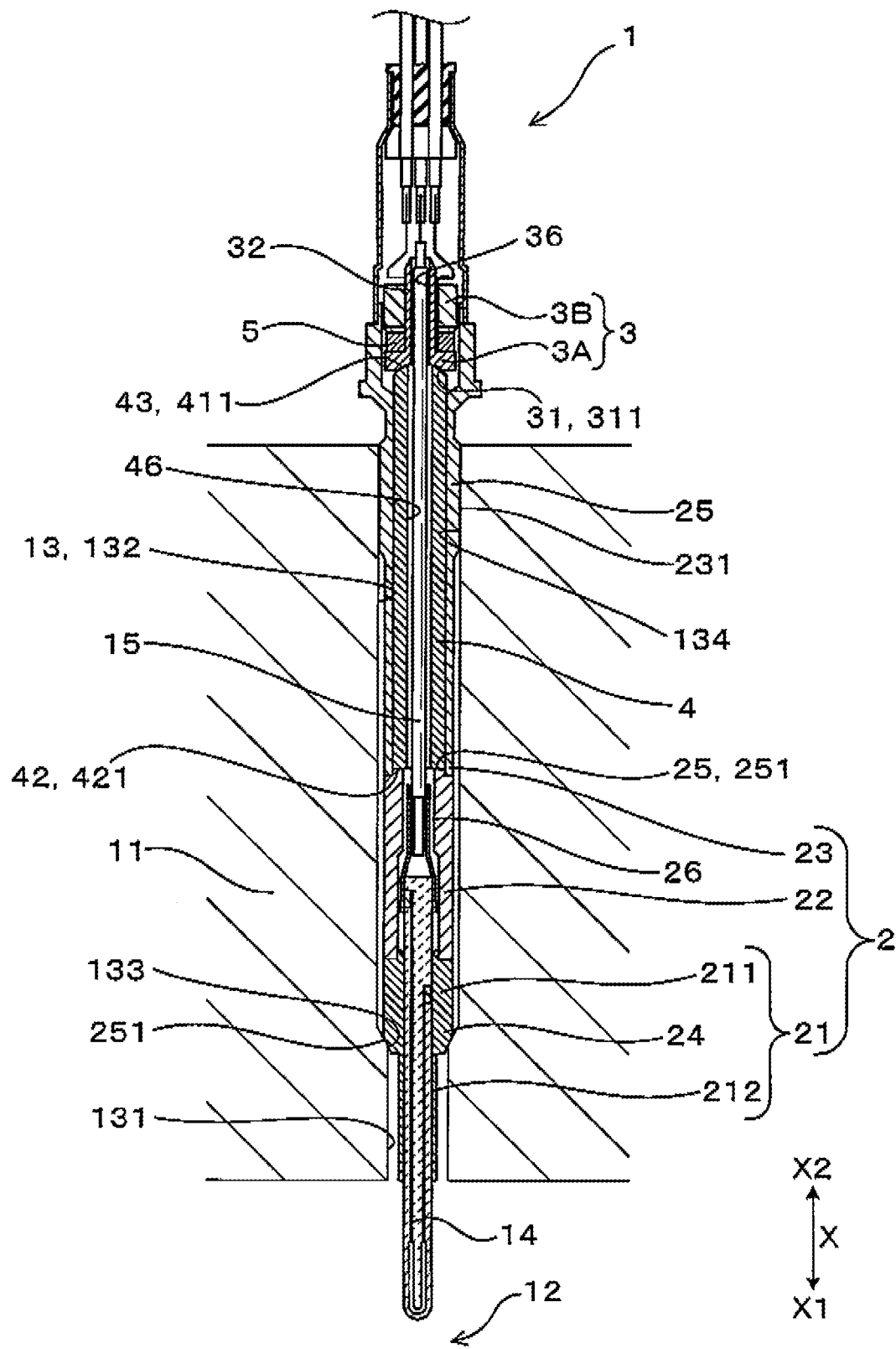
FIG. 1 is a longitudinal cross sectional view schematically illustrating a combustion pressure sensor according to the first embodiment of the present disclosure.

The following describe specific embodiments of the present disclosure with reference to the accompanying drawings. The following omits or simplifies descriptions of like parts between the embodiments, to which identical or like reference characters are assigned, thus eliminating redundant descriptions.

First Embodiment

The following describes a combustion pressure sensor 1 according to the first embodiment of the present disclosure with reference to FIGS. 1 to 5.

Referring to FIG. 1, the combustion pressure sensor 1 is designed to be integrated with a glow heater 14. The combustion pressure sensor 1 includes a longitudinal housing assembly 2, a sensor holder assembly 3, a longitudinal load transfer member 4, and a pressure sensor mechanism 5.

The housing assembly 2, which has, for example, a substantially hollow cylindrical shape, is fit in a plug fitting hole, i.e. a plug mount hole, 13 communicating with a combustion chamber 12 of a cylinder of an engine head 11. The sensor holder assembly 3, which has, for example, a substantially hollow cylindrical shape, is disposed at the inner peripheral side of the housing assembly 2.

The load transfer member 4, which has, for example, a substantially hollow cylindrical shape, is installed in the housing assembly 2 to be slidable in the axial direction X of the housing assembly 2, i.e. the combustion pressure sensor 1. The axial direction X corresponds to the longitudinal direction of the housing assembly 2. The load transfer member 4 is located to be closer to the combustion chamber 12 than, the sensor holder assembly 3 is. The load transfer member 4 is mechanically linked to the sensor holder assembly 3, so that the load transfer member 4 is operative to transfer compressive load applied to the housing assembly 2 to the sensor holder assembly 3.

The pressure sensor mechanism 5 has, for example, a substantially hollow cylindrical shape, a first end 5a, and a second end 5b opposite to the first end 5a. The pressure sensor mechanism 5 is installed in the housing assembly 2 and mechanically linked to the sensor holder assembly 3. The pressure sensor mechanism 5 is operative to detect the pressure in the combustion chamber 12 as a function of the load transferred to the sensor holder assembly 3.

A part of the glow heater 14 is disposed at the inner peripheral side of the housing assembly 2, and is operative to heat the inside of the combustion chamber 12.

The load transfer member 4 has a first end 42 and a second end 43 opposite to the first end 42; the first end 42 is closer to the combustion chamber 12 than the second end 43 is. The sensor holder assembly 3 has a first end 31 and a second end 32 opposite to the first end 31; the first end 31 is closer to the combustion chamber 12 than the second end 32 is.

The load transfer member 4 has formed a convexly curved contact surface 411 at the second end 43, and the sensor holder assembly 3 has formed a concavely curved contact surface 311 at the first end 31. The load transfer member 4 is disposed in the housing assembly 2 while the contact surface 411 is in contact with the contact surface 311 of the sensor holder assembly 3.

The combustion pressure sensor 1 has an axial direction X corresponding to the axial direction, i.e. the longitudinal direction, of each of the housing assembly 2 and the load transfer member 4. As described above, one end of any component installed in the combustion pressure sensor 1 along the axial direction X, which is closer to the combustion chamber 12 than the other end is, is referred to as a first end X1; the other end of any component installed in the combustion pressure sensor 1 is referred to as a second end X2.

The following describes the combustion pressure sensor 1 in more detail.

Referring to FIG. 1, the combustion pressure sensor 1 is fitted at its housing assembly 2 in the plug fitting hole 13 while a first end of the glow heater 14 projects to be located inside the combustion chamber of the engine head 11. The combustion pressure sensor 1 has (1) A first function of energizing the glow heater 14 using an elongated energization member 15 disposed in the load transfer member 4 to preheat the air-fuel mixture in the combustion chamber (2) A second function of measuring the combustion pressure in the combustion chamber 12 using the pressure sensor mechanism 5.

The housing assembly 2 includes a metallic first housing 21, a metallic second housing 22, and a metallic third housing 23 arranged in this order from the first end X1 to the second end X2 of the combustion pressure sensor 1.

The housing assembly 2 includes an external screw 231 mounted to the second-end side thereof, and the plug fitting hole 13 includes an internal screw 134 formed to the second end side of the inner periphery thereof.

Specifically, the combustion pressure sensor 1 is fitted in the plug fitting hole 13 such that 1. The outer periphery of the housing assembly 2 abuts on the inner periphery of the plug fitting hole 13

2. The external screw 231 is threadably engaged with the internal screw 134 of the plug fitting hole 13.

The first housing 21, which has a substantially hollow cylindrical shape, abuts on the inner periphery of the first end of the plug fitting hole 13. The glow heater 14 is partly held in the first housing 21. Specifically, the first housing 21 includes a thick portion 211 and a thin portion 212 disposed to be closer to the combustion chamber 12 than the thick portion 211. The thin portion 212 is communicably joined to the first end 24 of the thick portion 211. The thin portion 212 has an outer diameter smaller than an outer diameter of the thick portion 211.

The second housing 22 has a substantially hollow cylindrical shape with a center hole 26 formed axially therethrough. The second housing 22 is weld at its first end 24 to the second end of the thick portion 211 of the first housing 21. The first end of the energization member 15 has been located in the center hole 26 of the second housing 22.

The third housing 23, which has a substantially hollow cylindrical shape, is welded at its first end to the second end 25 of the second housing 22. The load transfer member 4 is fitted in the third housing 23 of the housing assembly 2. The load transfer member 4 has formed axially therethrough a center hole 46 in which the energization member 15 is located.

The plug fitting hole 13 includes a first portion 131 located to face the thin portion 212 of the first housing 21, and a second portion 132 has an inner diameter larger than an inner diameter of the first portion 131. The plug fitting hole 13 includes a shoulder portion 133 continuously intermediating between the first portion 131 and the second portion 132. The first end 24 of the 211 is located to abut on the shoulder portion 133 of the plug fitting hole 13. This prevents combustion gas in the combustion chamber 12 from leaking outside of the engine head 11 via the plug fitting hole 13.

For example, each of the metallic first, second, and third housings 21, 22, and 23 is made of stainless steel.

Figure 2:
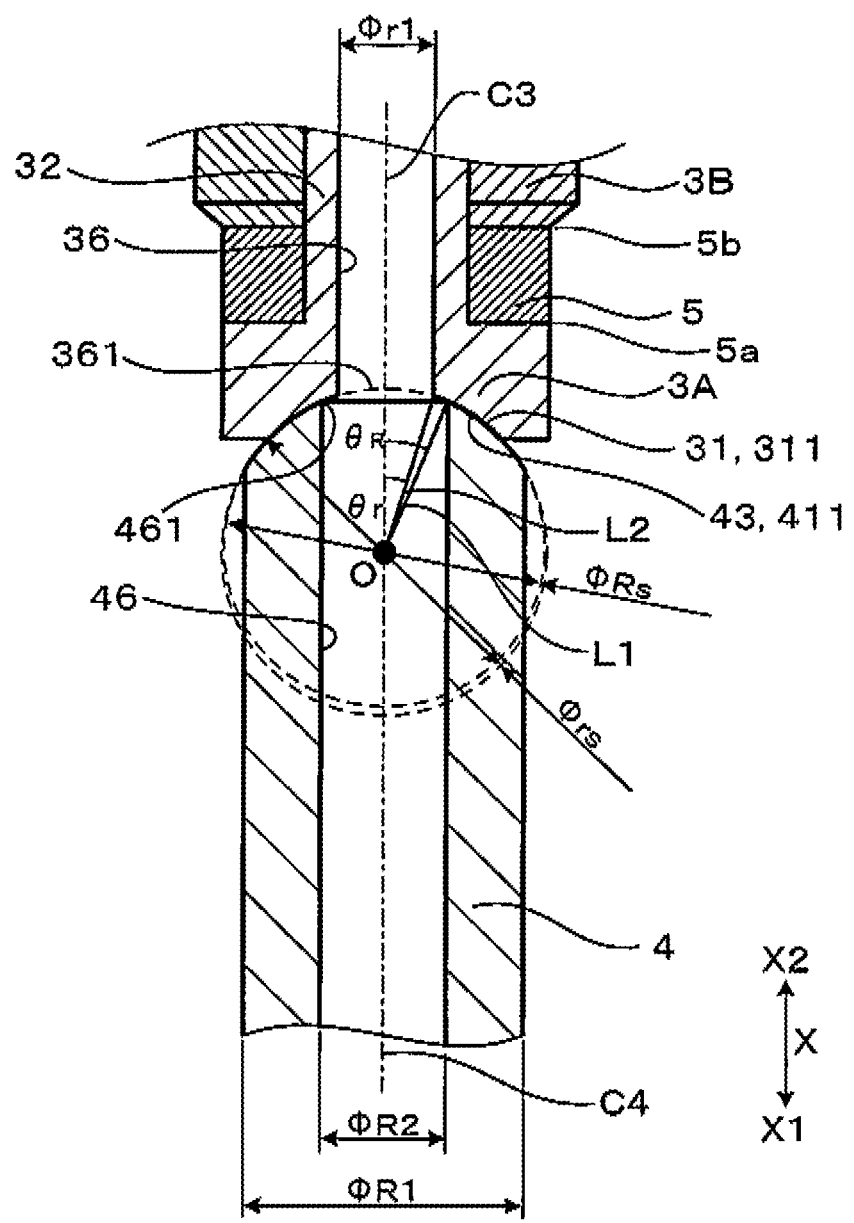
FIG. 2 is an enlarged longitudinal cross sectional view schematically illustrating a portion of the combustion pressure sensor; the portion includes the joint portion between a load transfer member and a sensor holder illustrated in FIG. 1.

Referring to FIGS. 1 and 2, the sensor holder assembly 3 includes a first sensor holder 3A and a second sensor holder 3B.

The first sensor holder 3A includes a hollow cylindrical end 31, a hollow cylindrical base 32. The first sensor holder 3A has formed axially therethrough a center hole 36. The hollow cylindrical end 31 of the first sensor holder 3A, which faces the second end 43 of the load transfer member 4, radially projects to have an outer diameter longer than an outer diameter of the hollow cylindrical base 32 of the first sensor holder 3A. The pressure sensor mechanism 5 is mounted around a part of the outer periphery of the hollow cylindrical base 32 of the first sensor holder 3A to abut on the hollow cylindrical end 31 of the first sensor holder 3A.

That is, the first sensor holder 3A has the conical concave contact surface 311 that is in contact with the spherical convex contact surface 411 of the second end 43 of the load transfer member 4.

The second sensor holder 3B is mounted around the remaining part of the outer periphery of the hollow cylindrical base to abut at its first end on the second end 5$b$ of the pressure sensor mechanism 5. That is, the pressure sensor mechanism 5 is sandwiched between the first and second sensor holders 3A and 3B in the axial direction of the combustion pressure sensor 1.

The second sensor holder 33 also has formed axially therethrough a center hole 36 communicating with the center hole 36 of the first sensor holder 3A, thus communicating with the center hole 46 of the load transfer member 4. The energization member 15 for energizing the glow heater 15 is located in the center hole 46 of the load transfer member 4, and the center holes 36 of the first and second sensor holder elements 36A and 36B.

The configuration of the sensor holder assembly 3 enables pressure applied to the pressure sensor mechanism 5 from the load transfer member 4 to be received by the second sensor holder 3B. For example, each of the first and second sensor holders 3A and 3B is made of metal, such as stainless steel.

The first end 42 of the load transfer member 4 abuts on the second end 25 of the second housing 22 of the housing assembly 2. For example, the load transfer member 4 is made of metal, such as stainless steel.

The pressure sensor mechanism 5 is comprised of at least one piezoelectric element and a circuit board on which the at least one piezoelectric element is for example mounted. As schematically illustrated in FIGS. 1 and 2 and as described above, the pressure sensor mechanism 5 is interposed between the first and second sensor holders 3A and 3B so as to be held therebetween.

The at least one piezoelectric element is made of a material having piezoelectric effect, such as crystal, piezoelectric zirconate titanate (PZT), or polyvinylidene fluoride. The pressure sensor mechanism 5 is subjected to a load transferred from the load transfer member 4; the load is based on a compressive stress applied to the housing 2. Then, the pressure sensor mechanism 5 is operative to generate an electrical charge proportional to the load received by the pressure sensor mechanism 5.

As described above, referring to FIG. 2, the contact surface 411 of the second end 43 of the load transfer member 4 has a convexly curved shape. The contact surface 311 of the first end 31 of the first sensor holder 3A has a concavely curved shape.

Each of the concavely curved contact surface 311 and the convexly curved contact surface 411 has a constant vale of the radius of curvature of the contact surface 311. The value of the radius of curvature of the concavely curved contact surface 311 is set to be greater the value of the radius of curvature of the convexly curved contact surface 411. In other words, the value of the radius of curvature of the convexly curved contact surface 411 is set to be equal to or smaller than the value of the radius of curvature of the concavely curved contact surface 311.

Specifically, each of the convexly curved contact surface 411 and the concavely curved contact surface 311 has a part of a spherical shape. Setting the radius of curvature of the concavely curved contact surface 311 to be equal to or greater than radius of curvature of the convexly curved contact surface 411 enables the convexly curved contact surface 411 and the concavely curved contact surface 311 to be smoothly swung relative to each other.

The contact surface 411 of the second end 43 of the load transfer member 4 is formed around an opening end 461 of the center hole 46. Similarly, the contact surface 311 of the first end 31 of the first sensor holder 3A is formed around an opening end 361 of the center hole 36.

In other words, the second end 43 of the load transfer member 4 has an end surface with the opening end 461 of the center hole 46 at the center of the end surface. The end surface of the second end 43 has the contact surface 411 around the opening end 461. Similarly, the first end 31 of the first sensor holder 3A has an end surface with the opening end 361 of the center hole 36 at the center of the end surface. The end surface of the first end 31 has the contact surface 311 around the opening end 361. The opening end 361 of the center hole 36 and opening end 461 of the center hole 46 face each other.

The range of the contact surface 411 formed on the end surface of the second end 43 and the range of the contact surface 311 formed on the end surface of the first end 31 are suitably determined in association with (1) The sizes of the respective center holes 46 and 33

(2) The tilt tolerance between one of a center axial line C4 of the load transfer member 4 and a center axial line C3 of the first sensor holder 3A of the sensor holder assembly 3 and the other thereof.

Specifically, as illustrated in FIG. 2, the radius of the outer periphery of the load transfer member 4 is expressed as φR1, the radius of the center hole 46 of the load transfer member 4 is expressed as φR2, and the radius of the center hole 36 of the first sensor holder 3A is expressed as φr1. Additionally, an angle between the center axial line C4 of the load transfer member 4 and a line L1 is expressed as $\theta_R$; the line L1 is defined as a line between the common center O of a predetermined first and second spherical shapes and an inner edge of the opening end 461 of the center hole 46. Each of the first and second spherical shapes is conformable to the corresponding one of the contact surfaces 411 and 311.

An angle between the center axial line C3 of the first sensor holder 3A and a line L2 is expressed as θr; the line L2 is defined as a line between the common center O and an inner edge of the opening end 361 of the center hole 36. The radius of curvature from the common center O to the convexly curved contact surface 411 is expressed as φRs, and the radius of curvature from the center O to the concavely curved contact surface 311 is expressed as φrs.

At that time, the following equations (1) and (2) are satisfied:

$$\phi rs \geq \phi Rs \qquad (1)$$

$$\phi Rs \geq \phi R1 \qquad (2)$$

When the tilt tolerance between one of the center axial line C4 of the load transfer member 4 and the center axial line C3 of the first sensor holder 3A and the other thereof is expressed as $\theta_E$, the following relational expression (3) is satisfied:

$$\theta_E \leq |\theta_R - \theta_r| \qquad (3)$$

Note that the angles $\theta_R$ and $\theta_r$ can be represented by the following equations (4) and (5):

$$\theta_R = \sin^{-1}(\phi R2/\phi Rs) \qquad (4)$$

$$\theta_r = \sin^{-1}(\phi r1/\phi rs) \qquad (5)$$

Determining an expected value of the tilt tolerance $\theta_E$ enables values of the dimensions φR1, φR2, φr1, φRs, and φrs to be determined.

The first end 42 of the load transfer member 4 has a flat contact surface 421 perpendicular to the center axial line C4, and the second end 25 of the second housing 22 of the housing assembly 2 has a flat contact surface 251 perpendicular to a center axial line C2 of the housing 2. Specifically, the flat contact surface 421 of the first end 42 of the load transfer member 4 contacts with the flat contact surface 251 of the second end 25 of the second housing 22 of the housing assembly 2. That is, the second housing 22 serves as a support portion to support the load transfer member 4 while the flat contact surface 421 is in contact with the flat contact surface 251.

There is a tilt of one of the center axial line C4 of the load transfer member 4 and the center axial line C3 of the first sensor holder 3A with respect to the other thereof due to at least one of the following causes (1) The center axial line C4 tilting with respect to the center axial line C2 of the housing 2

(2) The center axial line C3 tilting with respect to the center axial line C2 of the housing assembly 2

(3) Each of the center axial lines C4 and C3 tilting with respect to the center axial line C2 of the housing assembly 2, The inclination of the center axial line C4 of the load transfer member 4 with respect to the center axial line C3 of the first sensor is due to at least one of the following causes (1) A dimensional error of the axial length of the load transfer member 4 between the first end 42 to the second end 43

(2) An error of the perpendicularity of at least one of the flat contact surface 421 of the first end 42 of the load transfer member 4 and the flat contact surface 251 of the second end 25 of the housing assembly 2

(3) The second sensor holder 2B, which holds the base 32 of the first sensor holder 2A from the outer side of the base 32, being mounted to the housing assembly 2 while the axial direction of the second sensor holder 2B is inclined to the axial direction of the housing assembly 2.

In contrast, the above-configured combustion pressure sensor 1 maintains the contact surface 411 of the second end 41 of the load transfer member 4 and the contact surface 311 of the first end 31 of the sensor holder assembly 3 to be in contact with each other all-around the outer periphery of each of the center holes 36 and 46.

Figure 3:
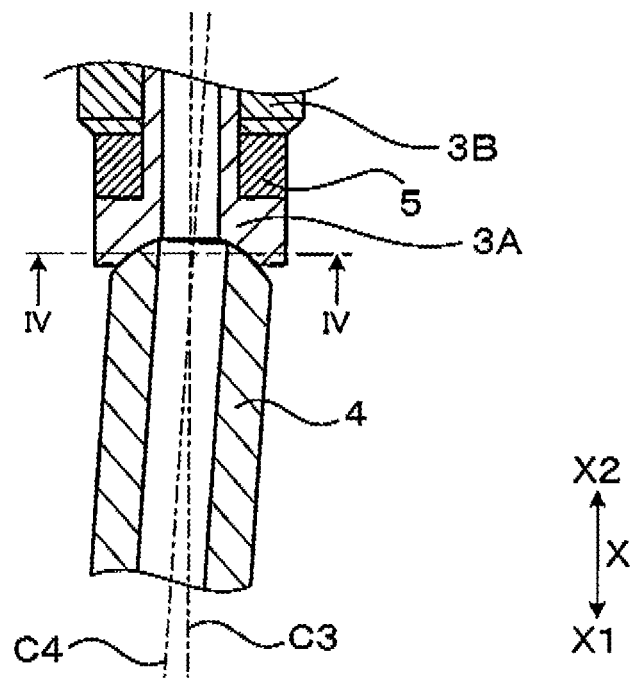
FIG. 3 is an enlarged longitudinal cross sectional view schematically illustrating the same portion of the combustion pressure sensor illustrated in FIG. 2 while an axial direction of the load transfer member tilts with respect to an axial direction of the sensor holder.
Figure 4:
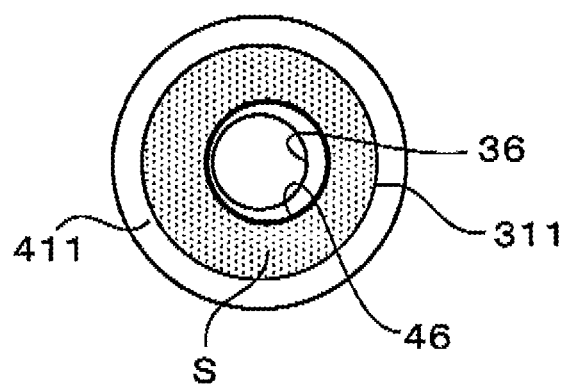
FIG. 4 is a cross sectional view taken on line IV-IV of FIG. 3.

FIG. 3 schematically illustrates a case where there is a tilt, i.e. an inclination, between the center axial line C4 of the load transfer member 4 and the center axial line C3 of the first sensor holder 3A. FIG. 4 illustrates a cross section taken upon line IV-IV of FIG. 3. In this case, as illustrated in FIG. 4, the contact surfaces 411 and 311 are maintained to be in surface contact with each other all-around the outer periphery of each of the center holes 36 and 46 while the contact area between the contact surfaces 411 and 311 at the tilting side is smaller than the contact area between the contact surfaces 411 and 311 at the side opposite to the tilting side. The contact surfaces 411 and 311 can be in line contact with each other. Note that reference character S represents the contact portion between the contact surfaces 411 and 311, which is hatched in FIG. 4.

Next, the following describes how the combustion pressure sensor 1 measures the combustion pressure in the combustion chamber 12.

A compressive stress applied to the engine head 11 based on the combustion pressure in the combustion chamber 12 is applied as a load to the housing assembly 2 fitted in the plug fitting hole 13 of the engine head 11 through the shoulder portion 133 and the internal screw 134. The housing assembly 2 is therefore subjected to the compressive stress, so that the compressive stress is applied as a load to the load transfer member 4 installed in the housing assembly 2. This results in the load being transferred to the pressure sensor mechanism 5 from the load transfer member 4 via the sensor holder assembly 3. Because the pressure sensor mechanism 5 sandwiched by the first and second sensor holders 3A and 3B is prevented from moving in the axial direction X, the compressive stress applied to the housing assembly 2 is efficiently received by the pressure sensor mechanism 5 so as to be measured by the pressure sensor mechanism 5 as a load. The load output from the pressure sensor mechanism 5 is subjected to a predetermined correction logic using, as its variables, engine parameters including, for example, intake pressure, engine RPM, and engine compression ratio, resulting in calculation of the combustion pressure in the combustion chamber 12.

Next, the following describes how the combustion pressure sensor 1 according to the first embodiment operates.

The combustion pressure sensor 1 is configured such that the contact surface 411 of the second end 43 of the load transfer member 4 has a convexly curved shape, and the contact surface 311 of the first end 31 of the first sensor holder 3A, which is in contact with the contact surface 411, has a concavely curved shape. This configuration enables one of the center axial line C4 of the load transfer member 4 and the center axial line C3 of the sensor holder assembly 3 to tilt relative to the other thereof even if there is a dimensional error of at least one of the components including the housing assembly 2, the first and second sensor holders 3A and 3B, and the load transfer member 4. Note that a dimensional error of at least one of the components may have an adverse effect on the alignment of the sensor holder assembly 3 and the load transfer member 4.

In other words, this configuration enables one of the load transfer member 4 and the sensor holder assembly 3 to be swingable relative to the other thereof while the contact surface 311 and the contact surface 411 are kept in contact with each other.

That is, referring to FIG. 3, the combustion pressure sensor 1 is configured such that the convexly curved contact surface 411 and the concavely curved contact surface 311 are constantly in contact with each other all-around the outer periphery of each of the center holes 36 and 46. This configuration absorbs adverse effects caused by an inclination of one of the axial direction of the load transfer member 4 and the first sensor holder 3A relative to the axial direction of the other thereof.

Specifically, this configuration enables the load transfer member 4 to transfer, to the whole of the first sensor holder 3A and the pressure sensor mechanism 5, a load uniformly around the circumferential direction of each center hole 411, 311.

This prevents a load applied to the pressure sensor mechanism 5 from being biased around the outer periphery of the center hole 36, thus enabling the combustion pressure sensor 1 to measure the combustion pressure in the combustion chamber 12 with higher accuracy.

Additionally, the configuration that the concavely curved contact surface 311 is in contact with the convexly curved surface 411 enables management of machining accuracy of the elements including the housing assembly 2, the first and second sensor holders 3A and 3B, and the load transfer member 4 to become more simple.

Figure 5:
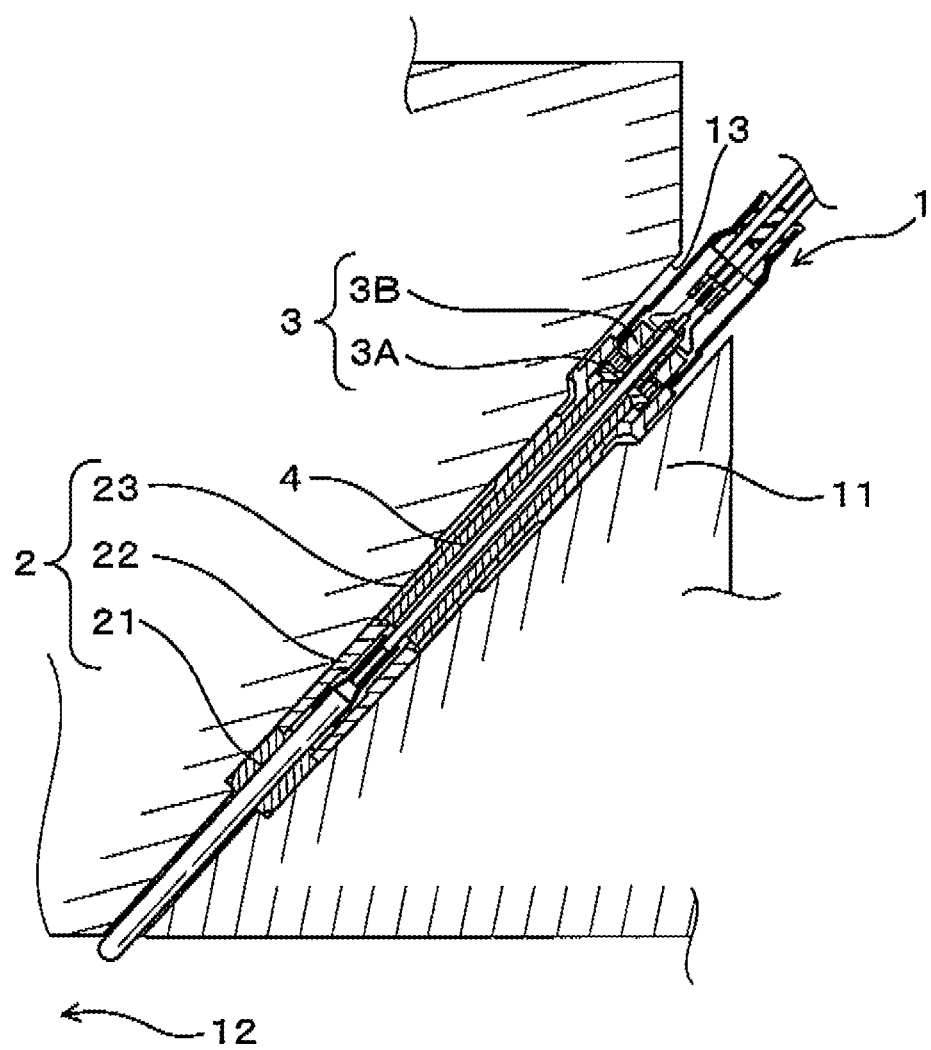
FIG. 5 is a longitudinal cross sectional view of the combustion pressure sensor according to the first embodiment while the combustion pressure sensor is disposed obliquely with respect to an axial direction of a combustion chamber of a cylinder.

FIG. 5 schematically illustrates another example of mounting the combustion pressure sensor 1 to the engine head 11. Specifically, the plug fitting hole 11 is disposed obliquely with respect to the axial direction of the combustion chamber 12 of a cylinder, so that the combustion pressure sensor 1 is arranged obliquely with respect to the axial direction of the combustion chamber 12 of the cylinder.

In this example, there may be variations of the temperature of the combustion pressure sensor 1 around its circumferential direction while the combustion pressure sensor 1 is heated based on the burning of the air-fuel mixture in the combustion chamber 12. It is not necessarily appropriate to suggest the temperature distribution in the combustion pressure sensor 1 because unillustrated coolant passages are formed to the engine head 11. Basically, however, we can suggest that the temperature of a first portion of the obliquely-arranged combustion pressure sensor 1, which is closer to the combustion chamber 12, is lower than the temperature of a second portion of the obliquely-arranged combustion pressure sensor 1, which is farther from the combustion chamber 12. This may result in thermal expansion of first portions of the components 2, 3A, 3B, and 4, which are closer to the combustion chamber 12, being larger than second portions of the components 2, 3A, 3B, and 4, which are farther from the combustion chamber 12.

In addition, there may be differences in linear expansion coefficient between the components 2, 3A, 3B, and 4, because of the differences of the constitutional materials of the components 2, 3A, 3B, and 4. Due to the differences, there may be differences in thermal stress between a first portion of the obliquely-arranged combustion pressure sensor 1, which is closer to the combustion chamber 12, and a second portion of the obliquely-arranged combustion pressure sensor 1, which is farther from the combustion chamber 12.

Even if these thermal expansion differences and/or the thermal stress differences occur, the obliquely-arranged combustion pressure sensor 1 enables one of the center axial line C4 of the load transfer member 4 and the center axial line C3 of the first sensor holder 3A to properly tilt relative to the other thereof while the convexly curved contact surface 411 is constantly engaged with the concavely curved contact surface 311.

This configuration therefore enables the load transfer member 4 to transfer, to the whole of the first sensor holder 3A and the pressure sensor mechanism 5, a load uniformly around the circumferential direction of the center hole 36 even if the combustion pressure sensor 1 is obliquely arranged with respect to the axial direction of the combustion chamber 12 of a cylinder.

This prevents a load applied to the pressure sensor mechanism 5 from being biased around the outer periphery of the center hole 36, thus enabling the combustion pressure sensor 1 to measure the combustion pressure in the combustion chamber 12 with higher accuracy.

As described in detail above, the combustion pressure sensor 1 according to the first embodiment achieves measurement of the combustion pressure in the combustion chamber 12 with higher measurement accuracy and with simpler management of machining accuracy of each component of the combustion pressure sensor 1.

Second Embodiment

Figure 6:
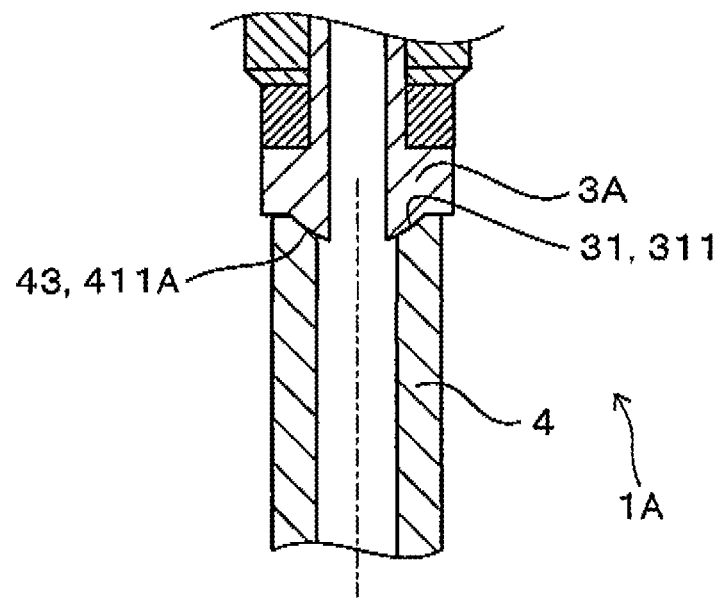
FIG. 6 is an enlarged longitudinal cross sectional view schematically illustrating a portion of a combustion pressure sensor; the portion includes the joint portion between a load transfer member and a sensor holder according to the second embodiment of the present disclosure.

The following describes a combustion pressure sensor 1A according to the second embodiment of the present disclosure with reference to FIG. 6.

The structure and/or functions of the combustion pressure sensor 1A according to the second embodiment are different from the combustion pressure sensor 1 according to the first embodiment by the following points. So, the following mainly describes the different points.

Referring to FIG. 6, the combustion pressure sensor 1A is specially configured such that 1. The load transfer member 4 has formed a concavely curved contact surface 411A at the second end 43
2. The sensor holder assembly 3 has formed a convexly curved contact surface 311A at the first end 31
3. The load transfer member 4 is disposed in the housing assembly 2 while the contact surface 411A is in contact with the contact surface 311A of the sensor holder assembly 3.

Like the first embodiment, the value of the radius of curvature of the convexly curved contact surface 311A is set to be equal to or smaller than the value of the radius of curvature of the concavely curved contact surface 411A.

This configuration of the combustion pressure sensor 1A achieves substantially the same advantageous effects as those achieved by the combustion pressure sensor 1.

Third Embodiment

Figure 7:
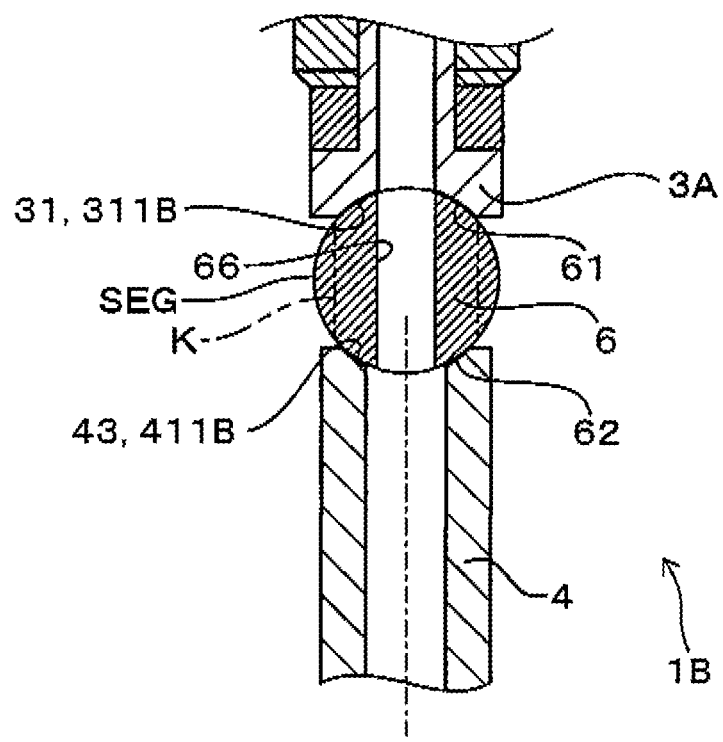
FIG. 7 is an enlarged longitudinal cross sectional view schematically illustrating a portion of a combustion pressure sensor; the portion includes the joint portion between a load transfer member, a joint member, and a sensor holder according to the third embodiment of the present disclosure.
Figure 8:
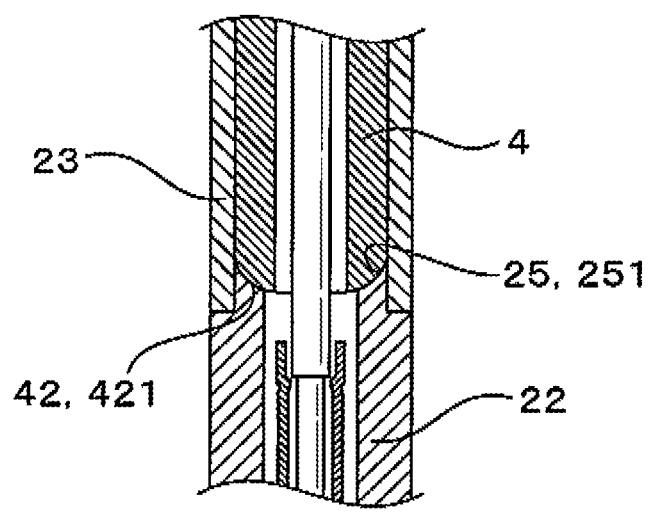
FIG. 8 is an enlarged longitudinal cross sectional view schematically illustrating a portion of a combustion pressure sensor according to a modification of each embodiment; the portion includes the joint portion between a load transfer member and a second housing of a housing assembly.

The following describes a combustion pressure sensor 1B according to the second embodiment of the present disclosure with reference to FIG. 7.

The structure and/or functions of the combustion pressure sensor 1B according to the third embodiment are different from the combustion pressure sensor 1 according to the first embodiment by the following points. So, the following mainly describes the different points.

The combustion pressure sensor 1B includes a spherical joint member 6 installed in the housing assembly 2 and interposed between the second end 43 of the load transfer member 4 and the first end 31 of the sensor holder assembly 3.

The joint member 6 has formed therethrough a center hole 66 in the axial direction X of the combustion pressure sensor 1B. The center hole 66 communicates with the center hole 36 of the sensor holder assembly 3 and with the center hole 46 of the load transfer member 4. The energization member 15 is located in the center hole 66.

The joint member 6 has a first axial end facing the first sensor holder 3A, and a second axial end opposite to the first axial end and facing the load transfer member 4.

The joint member 6 has formed a convexly curved end surface 61 at the first axial end, and has formed a convexly curved end surface 62 at the second axial end.

The combustion pressure sensor 1B is specially configured such that

1. The load transfer member 4 has formed a concavely curved contact surface 411B at the second end 43
2. The load transfer member 4 is disposed in the housing assembly 2 while the contact surface 411B is in contact with the convexly curved end surface 62 of the joint member 6 such that the load transfer member 4 is swingable relative to the joint member 6
3. The first sensor holder 3A has formed a concavely curved contact surface 311B at the first end 31
4. The first sensor holder 3A is disposed in the housing assembly 2 while the contact surface 311B is in contact with the convexly curved end surface 61 of the joint member 6 such that the sensor holder assembly 2 is swingable relative to the joint member 6.

That is, the combination of the load transfer member 4, the sensor holder 3, and the joint member 6 enables each of the load transfer member 4 and the first sensor holder 3A to freely tilt relative to the joint member 6.

Like the first embodiment, the value of the radius of curvature of each of the concavely curved contact surfaces 411B and 311B is set to be equal to or smaller than the value of the radius of curvature of the corresponding one of the convexly curved end surfaces 62 and 61 of the joint member 6.

For example, the joint member 6 is made of metal, such as stainless steel.

The joint member 6 can have a complete spherical shape with the center hole 66 formed therethrough. The joint member 6 also can have a substantially spherical shape from which one or more side segments SEG have been removed as illustrated by two-dot chain lines K as long as each of the load transfer member 4 and the first sensor holder 3A can freely tilt relative to the joint member 6.

The above-configured combustion pressure sensor 1B enables the center axial line C4 of the load transfer member 4 or the center axial line C3 of the sensor holder assembly 3 to tilt relative to the joint member 6 even if there is a dimensional error of at least one of the components including the housing assembly 2, the first and second sensor holders 3A and 3B, and the load transfer member 4; a dimensional error of at least one of the components may have an adverse effect on the alignment of the sensor holder assembly 3 and the load transfer member 4.

That is, referring to FIG. 7, the combustion pressure sensor 1B is configured such that the concavely curved contact surface 411E and the concavely curved contact surface 311B are constantly in contact with the respective convexly curved end surfaces 62 and 62 of the joint member 6

This configuration absorbs adverse effects caused by an inclination of the axial direction of the load transfer member 4 or the first sensor holder 3A relative to the joint member 6.

The following describes a modification of the combustion sensors 1 to 1B according to the respective first to third embodiments.

A combustion pressure sensor 1C according to the modification is configured such that 1. The load transfer member 4 has formed a convexly curved contact surface 421 at the first end 42

2. The second housing 22 has formed a concavely curved contact surface 251 at the second end 25

3. The load transfer member 4 is disposed in the housing assembly 2 while the contact surface 421 is in contact with the contact surface 251 of the second housing 22

4. One of the load transfer member 4 and the second housing 22 is swingable, i.e. pivotable, relative to the other thereof.

This configuration of the combustion pressure sensor 1C achieves the same advantageous effects as those achieved by the combustion pressure sensor 1 while enabling the contact surface 411 of the load transfer member 4 and the contact surface 311 of the sensor assembly 3, which are in contact with each other, to be shaped as a flat surface.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A combustion pressure sensor comprising:
a hollow longitudinal housing to be mounted in a plug mount hole of an engine with a combustion chamber, the plug mount hole communicating with the combustion chamber of the engine, the housing including a support portion having a support surface;
a sensor holder installed in the housing, the sensor holder having an end contact surface at one end thereof;
a load transfer member installed in the housing for transferring a compressive stress applied to the housing to the sensor holder as a load,
the load transfer member having a first contact surface at a first end thereof and a second contact surface at a second end thereof, opposite to the first end, in the longitudinal direction of the housing,
the first contact surface of the load transfer member being in contact with the support surface of the support portion of the housing,
the second contact surface of the load transfer member being in contact with the end contact surface of the sensor holder; and
a pressure sensor mechanism, held by the sensor holder, for obtaining a pressure in the combustion chamber based on the load transferred thereto from the load transfer member,
wherein the combustion pressure sensor comprises at least one of a first configuration and a second configuration,
the first configuration representing that one of the first contact surface and the support surface has a concavely curved shape and the other thereof has a convexly curved shape,
the second configuration representing that one of the second contact surface and the end contact surface has a concavely curved shape and the other thereof has a convexly curved shape.

2. The combustion pressure sensor according to claim 1, wherein the second contact surface of the load transfer member has the convexly curved shape, and the end contact surface of the sensor holder has the concavely curved shape,
the convexly curved second contact surface having a radius of curvature,
the concavely curved end contact surface having a radius of curvature,
the radius of curvature of the concavely curved end contact surface being equal to or larger than the radius of curvature of the convexly curved second contact surface.

3. The combustion pressure sensor according to claim 1, wherein the second contact surface of the load transfer member has the concavely curved shape, and the end contact surface of the sensor holder has the convexly curved shape,
the concavely curved second contact surface having a first radius of curvature,
the convexly curved end contact surface having a second radius of curvature,
the second radius of curvature of the convexly curved end contact surface being equal to or smaller than the first radius of curvature of the concavely curved second contact surface.

4. The combustion pressure sensor according to claim 1, wherein:
each of the load transfer member and the sensor holder has a center hole formed therethrough in the longitudinal direction of the housing; and
the housing has one end facing the combustion chamber, the combustion pressure sensor further comprising:
a glow heater partly installed in the housing, an end of the glow heater projecting to be located inside the combustion chamber; and
an energization member disposed in the center holes of the load transfer member and the sensor holder,
the center hole of the sensor holder having a first opening end,
the center hole of the load transfer member having a second opening end facing the first opening end,
the end contact surface of the sensor holder being located around the first opening end,
the second contact surface being located around the second opening end.

5. The combustion pressure sensor according to claim 2, wherein:
one of the load transfer member and the sensor holder is swingable relative to the other thereof while the second contact surface and the end contact surface are in contact with each other.

6. The combustion pressure sensor according to claim 3, wherein:
one of the load transfer member and the sensor holder is swingable relative to the other thereof while the second contact surface and the end contact surface are kept in contact with each other.

7. A combustion pressure sensor comprising:
a hollow longitudinal housing to be mounted in a plug mount hole of an engine with a combustion chamber, the plug mount hole communicating with the combustion chamber of the engine;
a sensor holder installed in the housing, the sensor holder having an end with a concavely curved contact surface;

a load transfer member installed in the housing for transferring a compressive stress applied to the housing to the sensor holder as a load, the load transfer member having an end facing the end of the sensor holder, the end of the load transfer member having a concavely curved contact surface;

a pressure sensor mechanism, held by the sensor holder, for obtaining a pressure in the combustion chamber based on the load transferred thereto from the load transfer member; and a joint member installed in the housing and interposed between the first end of the sensor holder and the second end of the load transfer member, the joint member having a first convexly curved end surface and a second convexly curved end surface opposite to each other in the longitudinal direction of the housing, the concavely curved contact surface of the sensor holder being in contact with the first convexly curved end surface of the joint member, the concavely curved contact surface of the load transfer member being in contact with the second convexly curved end surface of the joint member.

8. The combustion pressure sensor according to claim 7, wherein:

each of the load transfer member, the joint member, and the sensor holder has a center hole formed therethrough in the longitudinal direction of the housing; and the housing has one end facing the combustion chamber, the combustion pressure sensor further comprising:

a glow heater partly installed in the housing, an end of the glow heater projecting to be located inside the combustion chamber; and an energization member disposed in the center holes of the load transfer member, the joint member, and the sensor holder, the center hole of the sensor holder having a first opening end facing the first convexly curved end surface of the joint member, the center hole of the load transfer member having a second opening end facing the second convexly cured end surface of the joint member, the holder contact surface being located around the first opening end, the second contact surface being located around the second opening end.

9. The combustion pressure sensor according to claim 7, wherein:

the sensor holder is swingable relative to the joint member while the concavely curved contact surface of the sensor holder is in contact with the first convexly curved end surface of the joint member; and the load transfer member is swingable relative to the joint member while the concavely curved contact surface of the load transfer member is in contact with the second convexly curved end surface of the joint member.

* * * * *